July 1, 1958 J. G. CADILLAC ET AL 2,841,278
MOTOR VEHICLE PACKAGE
Filed Sept. 28, 1956 2 Sheets-Sheet 2
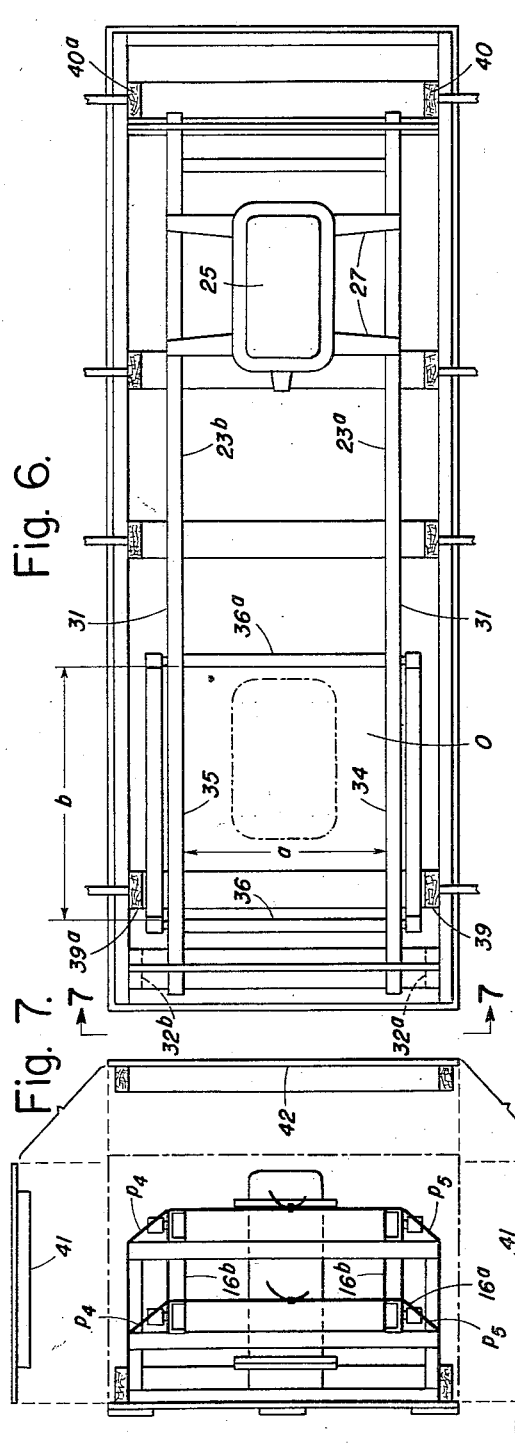
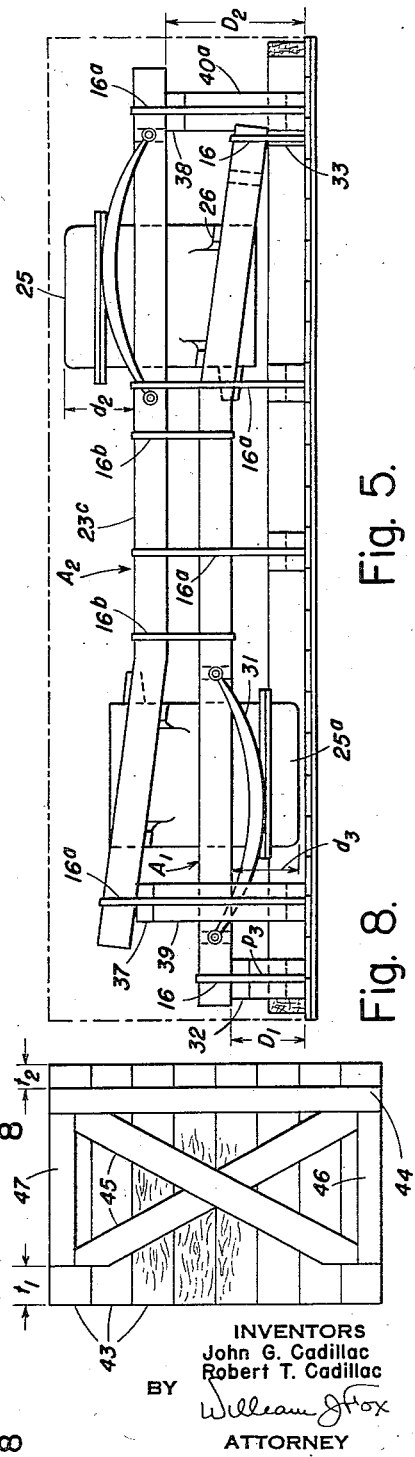
INVENTORS
John G. Cadillac
Robert T. Cadillac
BY William J. Fox
ATTORNEY

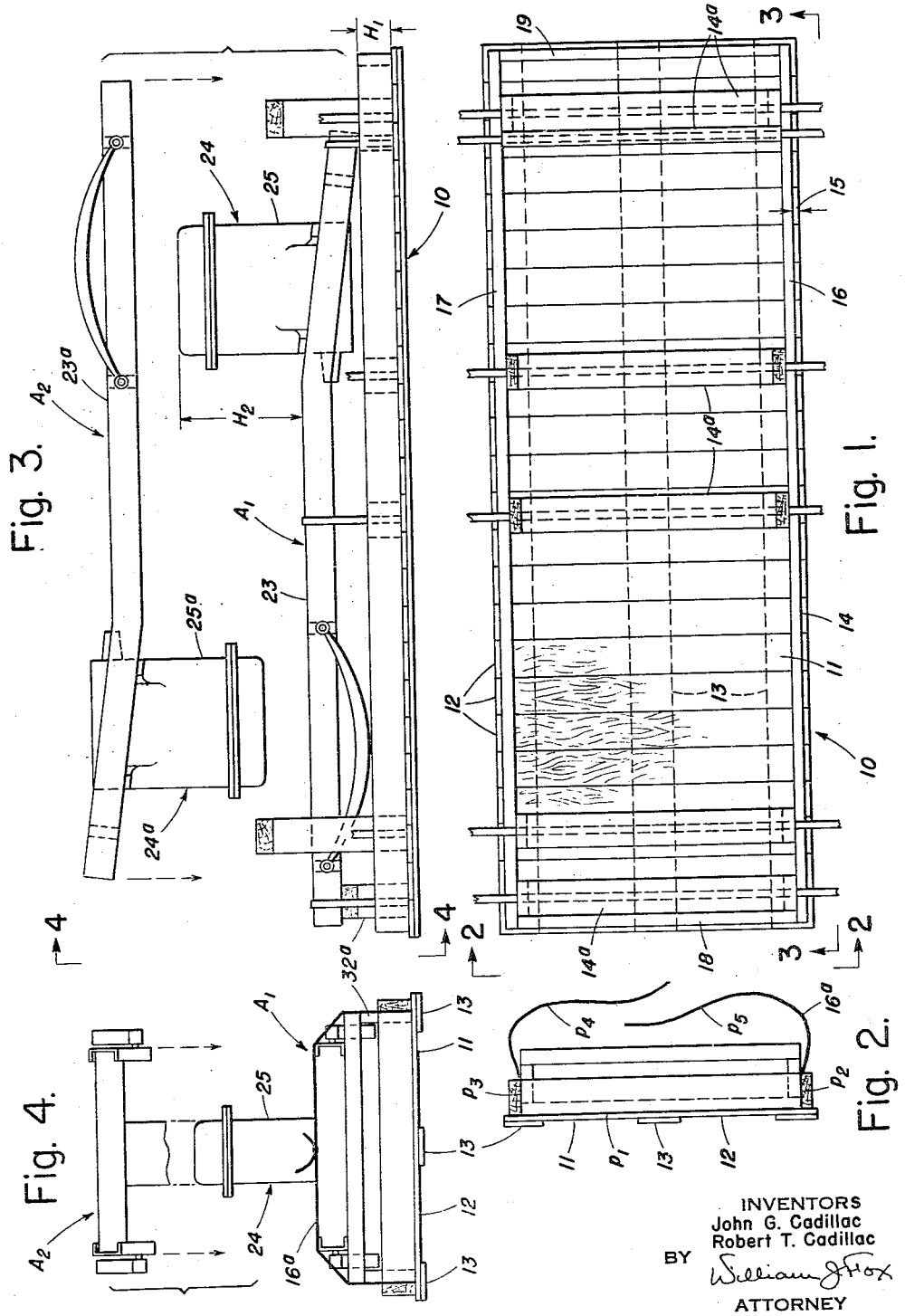

United States Patent Office 2,841,278
Patented July 1, 1958

2,841,278

MOTOR VEHICLE PACKAGE

John G. Cadillac, Jersey City, N. J., and Robert T. Cadillac, Brooklyn, N. Y., assignors to Aacon Contracting Co., Inc., Brooklyn, N. Y., a corporation of New York Application September 28, 1956, Serial No. 612,827

2 Claims. (Cl. 206—65)

This invention relates particularly to the shipping of such vehicles as trucks and is also useful for shipping automobiles and other equipment and especially to preparing and packaging or crating or boxing such vehicles for oversea's shipment where it is of great importance to minimize the required cubic shipping space and ensuing ocean freight transportation cost.

Various kinds of vehicle crating structures have been proposed for that purpose. Some such structures, for example, encompass the entire vehicle so that individually crated vehicles can be stacked in the ship's hold or on deck. Vehicles thus crated can be loaded or stacked to fill the cubic space of the vessel, yet, upon arrival at their destination can be freed of their casings and readily be rolled away or be driven away under their own power.

Other somewhat more compact types of crating structure require a degree of disassembly, for instance to the extent of removing the wheels so that the thus exposed wheel axles may be utilized for anchoring and fastening the vehicle to the bottom portion of the crating structure as by means of suitable adaptor mounting brackets provided at the bottom of the crating structure. In that instance, a somewhat greater shipping compactness is achievable at the cost of having to re-mount the wheels upon the axles.

In view of such prior practice, it is an object of this invention to effect a further significant reduction in shipping space requirements and shipping cost of the vehicles by way of increased compactness in the manner of packaging and crating, thereby to achieve net savings in oversea's shipping costs significantly outweighing any disassembly or assembly costs.

According to this invention, this object is attainable by establishing separate main assembly units of each vehicle, and combining a plurality of main assembly units of the same kind in a single crate or package. In this way, for instance, a plurality of vehicle body assemblies may be contained in one package, while a plurality of frame assemblies may be contained in another package. Nevertheless, the vehicles thus shipped and packed according to the precepts of this invention will present a net maximum of compactness requiring a net minimum of shipping space.

Further qualified, the above object is attainable by what may be termed complementary packaging, that is a manner of so organizing the component units relative to each other within the package, that the voids or recesses in the contour and structure of one unit are substantially occupied by the contour projections of a companion unit.

Specifically, this invention proposes to establish a sub-assembly unit or packaging component in the form of the vehicle frame structure bearing the engine with accessories, the differential drive assembly, as well as the axle assemblies. This specific packaging component structure constitutes in its vertical contour a roughly L-shaped structure with its long shank disposed horizontal along the general line of the chassis or frame, and the short shank in the form of the engine block rising from the front end of the frame.

This invention proposes to establish a pair of such specially contoured basic component structures of the vehicles in complementary relationship with respect to one another within a single package or crate, by placing one unit in inverted position above the other. In other words, one such unit is established in upright position upon a platform or crate bottom, and the companion unit is mounted or blocked up in inverted position thereabove in a complementary manner and relationship such that the short shank or engine block of the one L-shape becomes associated with the long shank or frame of the companion shape, and vice versa.

More specifically, the upstanding engine block of the bottom unit is associated with and surrounded by the free end of the frame of the inverted top unit, whereas the depending engine block of the top unit is associated with and surrounded by the free end portion of the frame of the bottom unit.

That is to say, in so establishing a complementary packaging relationship between the two specifically contoured identical vehicle components, this invention takes advantage of a structural characteristic of the vehicle chassis frame, which lies in the fact that the frame itself presents at its rear end portion a roughly rectangular shaped open or unobstructed area usually occupied by the rear axle of the vehicle. This open area is defined by the rear end portions of the main longitudinal stringers of the chassis frame, a transverse rear brace member interconnecting the rear ends of the stringers, and spaced horizontally inwardly therefrom another transverse brace member. Otherwise, the frame structure is occupied by the motor block with its accessories. Taking advantage of this structural characteristic, the invention provides that the two identical units or vehicle components be supported or blocked up with respect to each other in extremely compact relationship, whereby the motor block of the one component unit extends into and through the above defined open area of the other, that is the space between the two transverse brace members of the rear end portion of the frame. As a result, for the purpose of space saving packaging, the height and length of such as assembly of a pair of vehicle component structures are no greater than the length and height of a single such structure.

With the packaging assembly of the two companion units thus completed, the crating walls may be erected upon the platform and around the assembly, and the top of the crate may then be secured upon the walls.

An important feature of this specific manner of highly compacted packaging lies in the fact that the contents of the package are uniformly or symmetrically distributed with the two engine blocks concentrating an equal weight proportion in each respective end portion of the package.

Other features lie in the manner of mounting and securing the vehicle component structures relative to the bottom structure of the crate by means of an arrangement of metal packing strips structurally associated on the bottom structure in a special built-in manner.

An understanding of both the details and the principles of this invention may best be had by an immediate reference to the drawings which illustrate the preferred mode of application of the principles of this invention and to the following detailed description of this mode of application of this invention.

Figure 1 is a plan view of the crate bottom or platform ready for receiving the vehicle frame assemblies, with strapping means indicated for fastening them to the platform.

Figure 2 is an end view of the platform taken on line 2—2 of Figure 1.

Figure 3 is a side view of the platform with one vehicle frame in place thereon and the other in position prior to placement.

Figure 4 is an end view of the Figure 3 assembly, taken on line 4—4 of Figure 3.

Figure 5 is a side view similar to Figure 3, showing both vehicles in place upon the platform.

Figure 6 is a plan view of the frame assembly of Figure 5, although with the upper inverted frame omitted.

Figure 7 is an end view of the Figure 5 assembly, taken on line 7—7 of Figure 6, with the addition of the top portion and wall panels of the crate shown in exploded position, and indicated when in place.

Figure 8 is an inside view of a wall panel taken on line 8—8 of Figure 7.

The base or platform upon which to start the packaging procedure of this invention is represented by a crate bottom structure 10 (see Figs. 1 and 2) shown to comprise a floor 11 proper consisting of a combination of transverse floor boards 12 fastened together by means of a series of longitudinal members or skids 13. At the underside thereof, the bottom structure further comprises a rectangular rim portion or frame 14 of a height "$H_1$" and paralleling the rectangular outline of the floor 11, although spaced inwardly therefrom a small distance just sufficient to provide a narrow recess or outer floor shelf 15 to surround the rim 14 at the foot thereof. More precisely, the rim 14 comprises a pair of longitudinal members or boards 16 and 17 of substantial thickness, and a pair of transverse members or cross pieces 18 and 19 of similar cross-sectional configuration. These members or boards that constitute the rim portion 14 are placed edgewise upon the floor and are suitably fastened thereto as by nailing or other connecting or joining means. The members of the rim 14 in turn are fastened or nailed to the ends of the crossties 14a so that there results a rigidified bottom structure or receiving platform for the vehicle component structure described below. Furthermore, there are fastened to the underside of the floor 11, a plurality of longitudinal boards or skids 13.

Built-in fastening means are provided upon this bottom structure 10 in the form of metal packing strips 16a for securing the vehicle components with respect to each other as well as with respect to the bottom structure 10. In the present builtin arrangement, such a packing strip 16a here comprises an intermediate portion $P_1$ extending underneath and along the length of a crosstie 14a and thus confined and fixed between that cross tie 14a and the floor boards 12. Continuing portions $P_2$ and $P_3$ of the strip extend around the respective ends of the crosstie 14a in confinement between these ends and the respective adjoining portions or members of the rim 14. The strip 16a terminates in a pair of free end portions $P_4$ and $P_5$. In this way, the fastening or packing strip 16a is securely built into and anchored in the platform structure 10, yet in such a manner as to be entirely clear of the rim structure 14 itself and of the shelf 15 surrounding it. This built-in arrangement of the fastening strip 16a thus leaves the marginal and rim portions of the bottom structure free and unencumbered after the ends of the strip are closed and tightened around the vehicle component structures to be packaged.

In the packaging procedure according to this invention, there is first placed upon the platform structure 10 a vehicle component $A_1$ semi-diagrammatically shown to comprise a chassis-frame 23, an engine 24 mounted upon the front end of the frame 23 as indicated by an engine block 25 having pads 26 (see Fig. 5) supported upon the frame at points 27. The engine block is indicated to rise a distance "$H_2$" above the general horizontal extent of the chassis-frame. The chassis-frame 23 being shown semi-diagrammatically is indicated largely by a pair of longitudinally extending side members or stringers 23a and 23b rigidly connected with one another in the usual manner, including a rear cross brace member 36 and spaced inwardly therefrom another cross brace member 36a.

This component structure $A_1$ further comprises a pair of rear springs 31 shackled in the usual manner to the longitudinal stringers 23a and 23b respectively of the frame.

For mounting the vehicle component $A_1$ upon the bottom structure 10, there is provided transverse beam at one end of the chassis-frame 23 to support the same. The supporting beam 32 is spaced from the floor 11 a suitable distance by means of a pair of uprights or studs 32a and 32b of suitable height and thereby rigidly connected to the bottom structure 10, said studs being disposed at the inside of the rim structure 14. The opposite end of the chassis-frame 23 is supported upon a cross tie 33 placed on edge upon the floor 11 and suitably fixed thereto and to the longitudinal members 16 and 17 of the rim portion 14. In this way, the chassis-frame 23 is spaced a suitable distance $D_1$ from the floor 11.

The component structure $A_1$ is then securable to the bottom structure 10 by the closing, tightening up, and securing of the respective packing strips 16a around and across the component structure $A_1$ as seen in the showing of Figure 4.

The packaging according to this invention is further proceeded with by placing above the component structure $A_1$ a second or companion component structure $A_2$ substantially identical to $A_1$ already mounted.

Figure 3 shows the second component structure $A_2$ in an inverted preliminary position prior to being lowered and mounted upon the bottom structure 10.

At this point, note should be taken of the fact that the rear end portion of the frame of each of the component structures $A_1$ and $A_2$ presents an open and substantially unobstructed area "O" here roughly indicated by an area of rectangular configuration defined by the dimensions "$a$" and "$b$" thereof. This open area "O," structurally, is defined or is bounded at the sides by the rear end portions 34 and 35 of the stringers 23a and 23b of the chassis-frame, at the rear end by a transverse brace 36 of the chassis-frame, and at the opposite end by the cross brace member 36a.

Reference may now be had to the Figure 5 phase of this packaging procedure, showing the inverted component structure $A_2$ in place, that is mounted and supported upon the bottom structure 10 although above the first or bottom component structure $A_1$ and in complementary packaging relationship therewith. That is to say, by lodging in the open area "O" as above defined, the engine block of each component structure is associated with and surrounded by the rear end portion of the chassis-frame of the other or companion structure. This complementary relationship is illustrated and visible in Figure 5 by the upright engine block 25 extending upwardly a distance $d2$ beyond the chassis-frame 23c of the upper component structure A2, while similarly the depending engine block 25a of the upper component structure A2 extends downwardly a distance $d3$ beyond the chassis-frame 23 of the lower component structure $A_1$.

For supporting the upper component structure A2 upon the bottom structure 10 there are provided a pair of transverse beams 37 and 38 rigidly connected to the bottom structure 10. That is, each such beam supporting a respective end of the chassis-frame 23c of upper component structure $A_2$ is in turn rigidly spaced from the floor 11 by means of a pair of studs 39 and 40 and 39a and 40a respectively rising from the bottom structure at the inner side of the rim portion 14 thereof. In this way, the chassis-frame 23c is spaced a distance $D_2$ from the floor 11 of the bottom structure 10.

Again, the upper component structure $A_2$ is secured in place by metal packing strip 16a (see Fig. 7) employed and applied in a manner similar to that described above for the packing strips for securing the lower component structure A₁.

Referring to Figure 7, there is indicated the manner in which the crating of the package is completed after the component structures A₁ and A₂ have been placed and secured upon the bottom structure 10. To this end, there are shown, in exploded fashion such crating sections as a pair of upright wall panels 41 as well as a top or roof structure 42. The manner in which these members are joined together to complete the crating operation is indicated in Figure 7 in the dot-and-dash lines showing of the sections when in place. Referring to the detail Figure 8, a view upon the inner side of a wall panel 41 indicates that the panel comprises vertical boards 43 tied together at the top by a cross tie 44, and having diagonal bracing members 45, and that the side portions of the panel are reinforced by studs or jambs 46 and 47. It is noted that this bracing arrangement is such as to leave free and unencumbered the end portions T₁ and T₂ of the panel so that they may readily lend themselves to being joined with the bottom and top structures of the crate in the manner indicated by the dot-and-dash line showing of the parts in Figure 7. Furthermore, there are provided interconnecting packing strips 16b for tightening the two component structures A₁ and A₂ directly with respect to one another and independent of the bottom structure 10.

It will then be seen that the component structures A₁ and A₂ become unitary with each other as well as with the bottom structure 10 in the sense that the bottom structure, in fact, thereby acquires rigidity and consequently presents a relatively non-deformable base upon which the remaining shell structure, namely the side walls, the end walls, and the top member can be erected and secured.

What we claim is:

1. In a package for crating a motor vehicle component structure substantially in the form of a horizontal vehicle chassis frame with an engine block mounted upon the front end of the frame, the combination which comprises a crate bottom structure constituting a platform, a first component structure in the form of said chassis frame with the engine block rising therefrom in normal upright position, lower supporting means positioning the first component structure horizontally upon said platform, a second similar component structure inverted with the motor block depending from the frame and disposed in complementary relationship with the first component structure with the upright engine block of the first component structure is surrounded by the rear end portion of the frame of the second component structure while the depending engine block of the second component structure is surrounded by the rear end portion of the frame of the first component structure, higher supporting means positioning the second component structure horizontally upon the platform in the above defined complementary relationship with respect to the first component structure, first securing means fastening the first component structure with respect to said lower supporting means, and second securing means fastening said second component structure with respect to said higher supporting means.

2. The combination according to claim 1, and in which said first securing means comprise a first set of metal straps, comprising at least a pair, extending parallel and in horizontally spaced relationship with respect to one another across the platform and fastened thereto, each strap of said first set having a pair of free end portions fastened together tight across a respective end portion of the frame of the first component structure, a second set of metal straps, comprising at least a pair, extending parallel and in horizontally spaced relationship with respect to one another across the platform and fastened thereto, each strap of said second set having a pair of free end portions fastened together tight across a respective end portion of the frame of the second component structure, and a third set of metal straps free of said platform and transversely surrounding both said frames in tight relationship therewith.

References Cited in the file of this patent

UNITED STATES PATENTS

| | | |
|---|---|---|
| 1,339,890 | Hopkins | May 1, 1920 |
| 1,373,091 | Mulcahy | Mar. 29, 1921 |
| 2,212,310 | Wokosin | Aug. 20, 1940 |

FOREIGN PATENTS

| | | |
|---|---|---|
| 295,779 | Italy | Apr. 29, 1932 |